US010879593B2

(12) United States Patent
Kim et al.

(10) Patent No.: US 10,879,593 B2
(45) Date of Patent: *Dec. 29, 2020

(54) MOBILE TERMINAL

(71) Applicant: LG ELECTRONICS INC., Seoul (KR)

(72) Inventors: Duckyun Kim, Seoul (KR); Yunmo Kang, Seoul (KR); Byungwoon Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/848,711

(22) Filed: Apr. 14, 2020

(65) Prior Publication Data
US 2020/0243949 A1 Jul. 30, 2020

Related U.S. Application Data

(63) Continuation of application No. 16/030,425, filed on Jul. 9, 2018, now Pat. No. 10,658,732.

(30) Foreign Application Priority Data

Jan. 4, 2018 (KR) .................. 10-2018-0001094

(51) Int. Cl.
*H01Q 1/24* (2006.01)
*H04M 1/02* (2006.01)
(Continued)

(52) U.S. Cl.
CPC .............. *H01Q 1/243* (2013.01); *H01Q 5/378* (2015.01); *H01Q 9/30* (2013.01); *H01Q 9/42* (2013.01); *H01Q 21/28* (2013.01); *H04M 1/026* (2013.01)

(58) Field of Classification Search
CPC .......... H01Q 1/243; H01Q 9/42; H01Q 21/28; H01Q 7/00; H01Q 9/0421; H01Q 1/2266;
(Continued)

(56) References Cited

U.S. PATENT DOCUMENTS 10,658,732 B2 * 5/2020 Kim ..................... H01Q 9/42
2011/0032161 A1 * 2/2011 Nakanishi ............. H01Q 9/30
343/702

(Continued)

FOREIGN PATENT DOCUMENTS

CN 102007641 4/2011
CN 103346383 10/2013
(Continued)

OTHER PUBLICATIONS

PCT International Application No. PCT/KR2018/007907, Notification of Transmittal of the International Search Report and the Written Opinion of the International Searching Authority, or Declaration dated Oct. 22, 2018, 9 pages.

(Continued)

*Primary Examiner* — George Eng
*Assistant Examiner* — Jing Gao
(74) *Attorney, Agent, or Firm* — Lee, Hong, Degerman, Kang & Waimey

(57) ABSTRACT

There is disclosed a mobile terminal including a display unit; a metal bracket comprising a middle frame provided in a rear surface of the display unit; and a side frame partially distant from the middle frame and configured to define a lateral surface; a main board loaded in a rear surface of the bracket; a rear case configured to cover the main board and define an external appearance of a rear surface; and a first conductive pattern formed in an inner surface of the rear case, wherein the main board comprises a first feeding portion connected with the side frame; a second feeding
(Continued)

(a)

(b)

(c)

portion connected with the first conductive pattern; and a first grounding portion connected with the side frame and the first conductive pattern and located between the first feeding portion and the second feeding portion.

7 Claims, 10 Drawing Sheets

(51) Int. Cl.
*H01Q 21/28* (2006.01)
*H01Q 9/30* (2006.01)
*H01Q 9/42* (2006.01)
*H01Q 5/378* (2015.01)

(58) Field of Classification Search
CPC ............ H01Q 1/38; H01Q 1/24; H01Q 1/241; H01Q 1/50; H01Q 21/30; H01Q 5/378; H01Q 9/30; H01Q 1/273; H01Q 5/328; H01Q 1/242; H01Q 1/36; H01Q 19/10; H01Q 19/30; H01Q 5/35; H01Q 21/065; H01Q 5/335; H01Q 5/364; H01Q 9/04; H01Q 9/0485; H01Q 13/06; H01Q 1/2291; H01Q 1/245; H01Q 1/521; H01Q 5/10; H01Q 5/307; H01Q 9/045; H01Q 13/106; H01Q 1/244; H01Q 21/29; H01Q 5/49; H01Q 9/16; H01Q 13/18; H01Q 1/08; H01Q 1/084; H01Q 1/085; H01Q 1/362; H01Q 1/523; H01Q 21/0006; H01Q 23/00; H01Q 3/24; H01Q 5/30; H01Q 5/392; H04M 1/026; H04M 1/0235; H04M 1/0268; H04M 1/0214; H04M 1/0266; H04M 2250/16; H04M 1/0216; H04M 1/0202; H04M 1/0218; H04M 1/0277; H04M 1/0274; H04M 1/02; H04M 1/0208; H04M 1/0237; H04M 1/0245; H04M 1/0283; H04W 88/06; H04W 4/80; H04W 84/12
See application file for complete search history.

(56) References Cited

U.S. PATENT DOCUMENTS

| | | |
|---|---|---|
| 2014/0062801 A1 | 3/2014 | Yong et al. |
| 2015/0207211 A1* | 7/2015 | Martiskainen ......... H01Q 1/243 343/702 |
| 2016/0197403 A1 | 7/2016 | Choi et al. |
| 2017/0262295 A1 | 9/2017 | Kim et al. |
| 2017/0346164 A1* | 11/2017 | Kim .................... H04M 1/0266 |
| 2019/0207296 A1 | 7/2019 | Kim et al. |

FOREIGN PATENT DOCUMENTS

| | | | | |
|---|---|---|---|---|
| CN | 103346383 B | * | 3/2016 | ............... H01Q 5/40 |
| CN | 205081814 | | 3/2016 | |
| CN | 105763206 | | 7/2016 | |
| CN | 106887699 | | 6/2017 | |
| CN | 107453040 | | 12/2017 | |
| KR | 1020170133952 | | 12/2017 | |
| WO | 2010125240 | | 11/2010 | |
| WO | 2015156606 | | 10/2015 | |

OTHER PUBLICATIONS

U.S. Appl. No. 16/030,425, Final Office Action dated Nov. 1, 2019, 14 pages.
U.S. Appl. No. 16/030,425, Office Action dated Apr. 8, 2019, 18 pages.
State Intellectual Property Office of the People's Republic of China Application Serial No. 201880050091.6, Office Action dated Oct. 10, 2020, 8 pages.

* cited by examiner

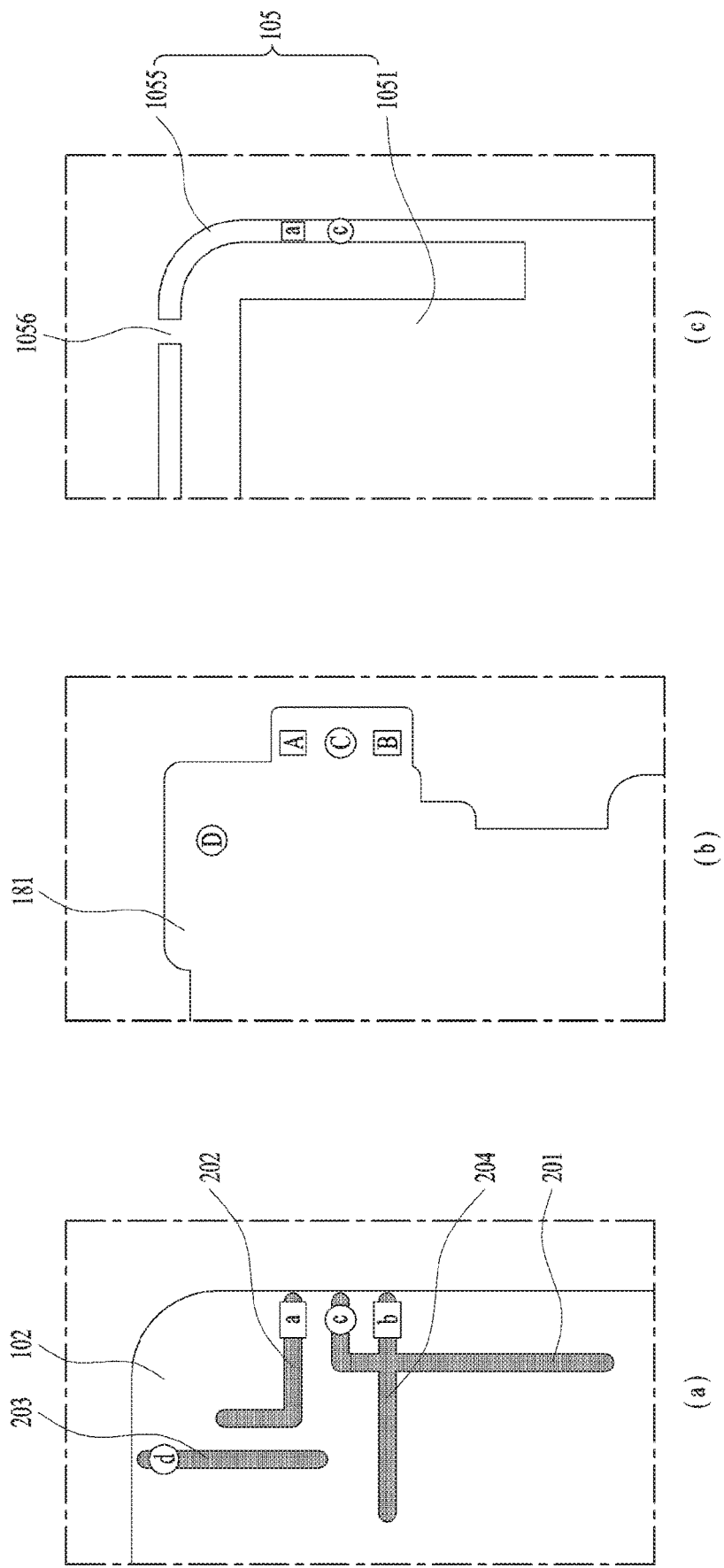

FIG. 3
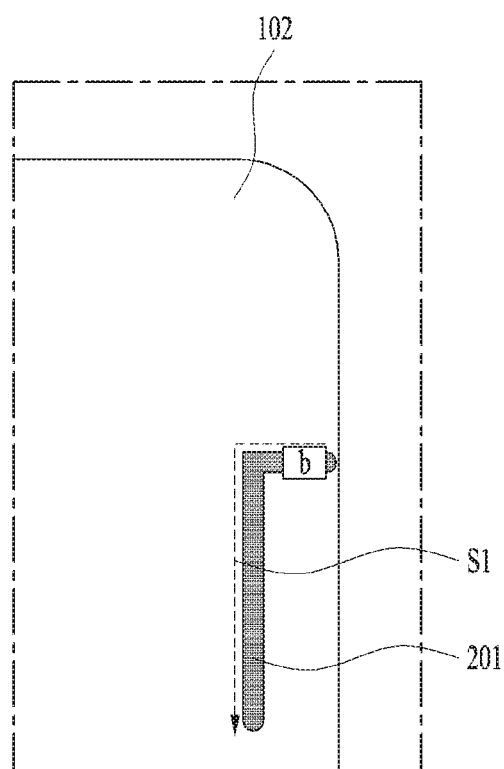
(a)
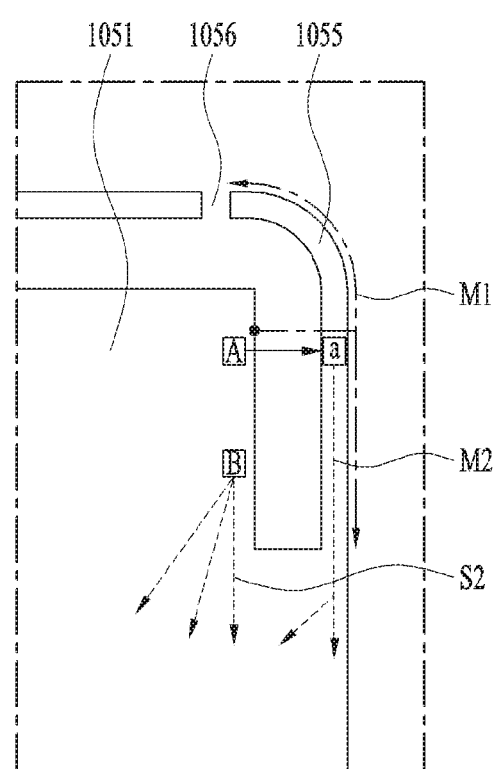
(b)

FIG. 4
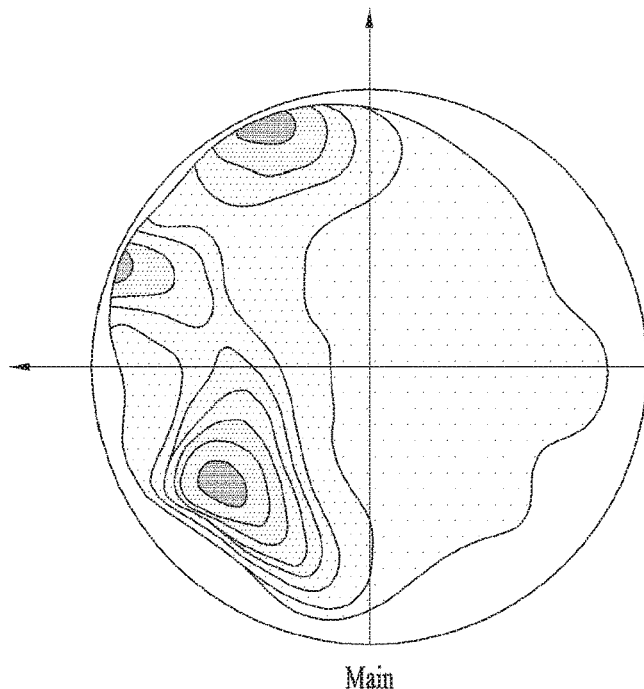
(a)
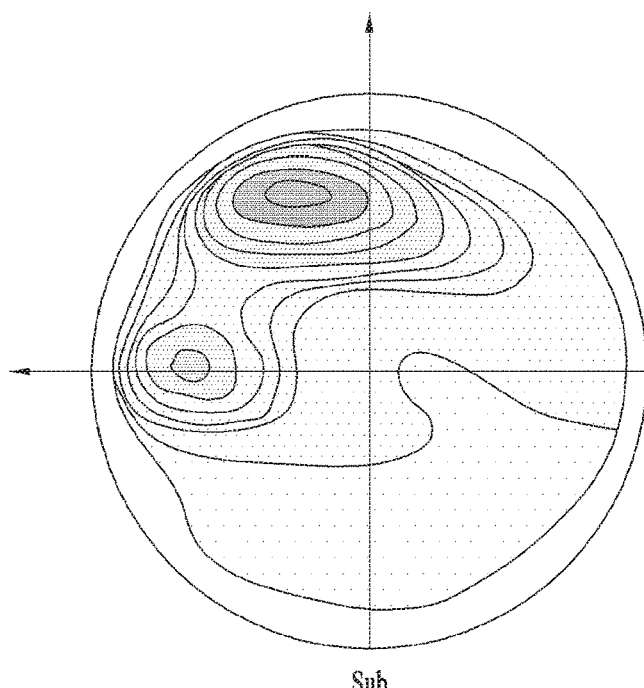
(b)

FIG. 7
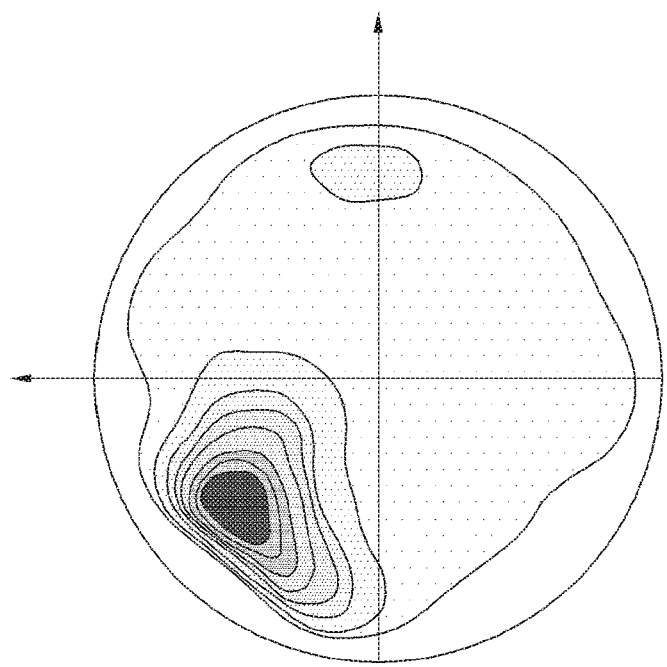
(a)
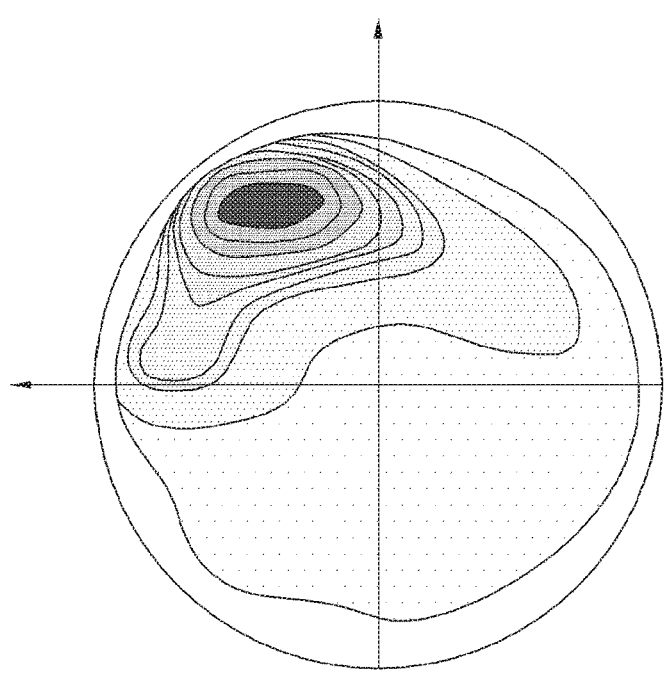
(b)

FIG. 9
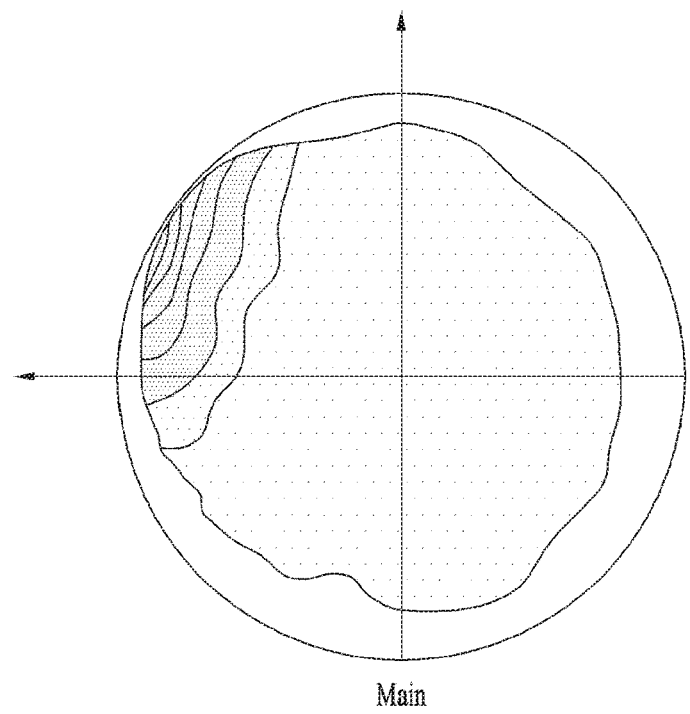
(a)
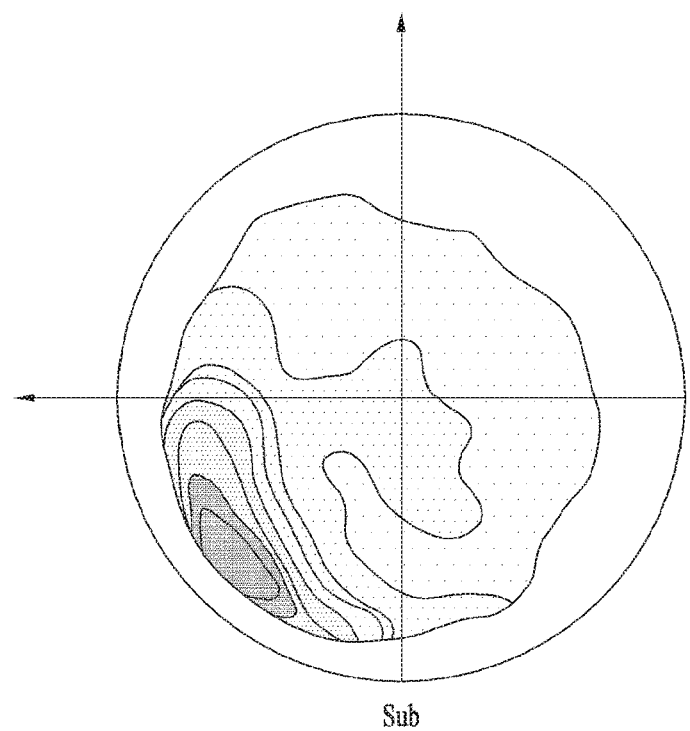
(b)

MOBILE TERMINAL

CROSS-REFERENCE TO RELATED APPLICATIONS

This application is a continuation of U.S. patent application Ser. No. 16/030,425, filed on Jul. 9, 2018, now U.S. Pat. No. 10,658,732, which claims the benefit of earlier filing date and right of priority to Korean Patent Application No. 10-2018-0001094, filed on Jan. 4, 2018, the contents of which are hereby incorporated by reference herein in its entirety.

BACKGROUND OF THE DISCLOSURE

Field of the Disclosure

Embodiments of the present disclosure relate to a mobile terminal having a structure which is able to secure an antenna performance even when minimizing a bezel size.

Background of the Disclosure

Terminals may be generally classified as mobile/portable terminals or stationary terminals according to their mobility. Such terminals may be classified as handheld terminals and vehicle mounted terminals according to presence of a user's direct portability.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

With the expansion of such the functions provided in the mobile terminal, diverse types of wireless communication may be applied so as to facilitate transmission of data wirelessly. To use such diverse wireless communication methods, antennas having different frequency characteristics, respectively, may be provided. Even a plurality of antennas implemented in one frequency band may be also provided to transceive more data and then the data can be transceived simultaneously or sequentially.

In this instance, such wireless communication has a disadvantage of being subject to peripheral electronic components enough to cause mutual interference. Accordingly, there are ongoing studies and researches about distances and arrangement between antennas and other electronic components or between the antennas.

SUMMARY OF THE DISCLOSURE

Accordingly, an object of the present invention is to address the above-noted and other problems.

Another object of the present invention is to provide a mobile terminal which includes an antenna radiator which is able to minimize interference between antennas.

Embodiments of the present disclosure may provide a mobile terminal comprising a display unit; a metal bracket comprising a middle frame provided in a rear surface of the display unit; and a side frame partially distant from the middle frame and configured to define a lateral surface; a main board loaded in a rear surface of the bracket; a rear case configured to cover the main board and define an external appearance of a rear surface; and a first conductive pattern formed in an inner surface of the rear case, wherein the main board comprises a first feeding portion connected with the side frame; a second feeding portion connected with the first conductive pattern; and a first grounding portion connected with the side frame and the first conductive pattern and located between the first feeding portion and the second feeding portion.

The side frame may comprise one end connected with the middle frame and the other end which is open, and a first point connected with the first feeding portion may be closer to the other end of the side frame than a second point connected with the second feeding portion.

A distance from the second point to the other end of the side frame may be corresponding to ¼ of a wavelength of a frequency of an alternating current power source supplied by the first feeding portion.

The first conductive pattern may be configured to transceive a first frequency signal having a wavelength which is four times as long as the length of the first conductive pattern.

The first conductive pattern may be extended from one end of the side frame in the reverse direction of the other end.

The main board may comprise a second grounding portion which is distant from the first grounding portion, and the mobile terminal may further comprise a second conductive pattern formed in an inner surface of the rear case and connected with the first feeding portion; and a third conductive pattern arranged near the second conductive pattern, not connected with the second connected, and having one end connected with the second grounding portion.

The third conductive pattern may be configured to transceive a second frequency signal having a wavelength which is four times as long as the length of the third conductive pattern.

The mobile terminal may further comprise a fourth conductive pattern connected with the first grounding portion and the second feeding portion and having a corresponding length to ¼ of the wavelength of the second frequency.

The first grounding portion and the second grounding portion may be distant from each other as far as ¼ of the wavelength of the second frequency.

The extension direction of the third conductive pattern from the second grounding portion may be perpendicular to the extension direction of the fourth conductive pattern from the first grounding portion.

The mobile terminal in accordance with the embodiments of the present disclosure is capable of reducing the interference between the ground electric current flow of the main antenna and the ground electric current flow of the sub-antenna. Accordingly, the MIMO antenna may be realized in a narrow area.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 2 is a diagram illustrating a rear case, a main board and a middle bracket which are provided in the mobile terminal;

FIG. 3 is a diagram to describe the ground current flow of main and sub antennas for a first signal of the mobile terminal;

FIG. 4 is a diagram illustrating the ground current distribution of the main and sub antennas which are shown in FIG. 3;

FIG. 7 is a diagram illustrating the ground current distribution of the main and sub antennas for the first signal provided in the mobile terminal;

FIG. 9 is a diagram to describe the ground current distribution of the main and sub antennas for the second signal which are provided in the mobile terminal.

DESCRIPTION OF SPECIFIC EMBODIMENTS

Figure 1A:
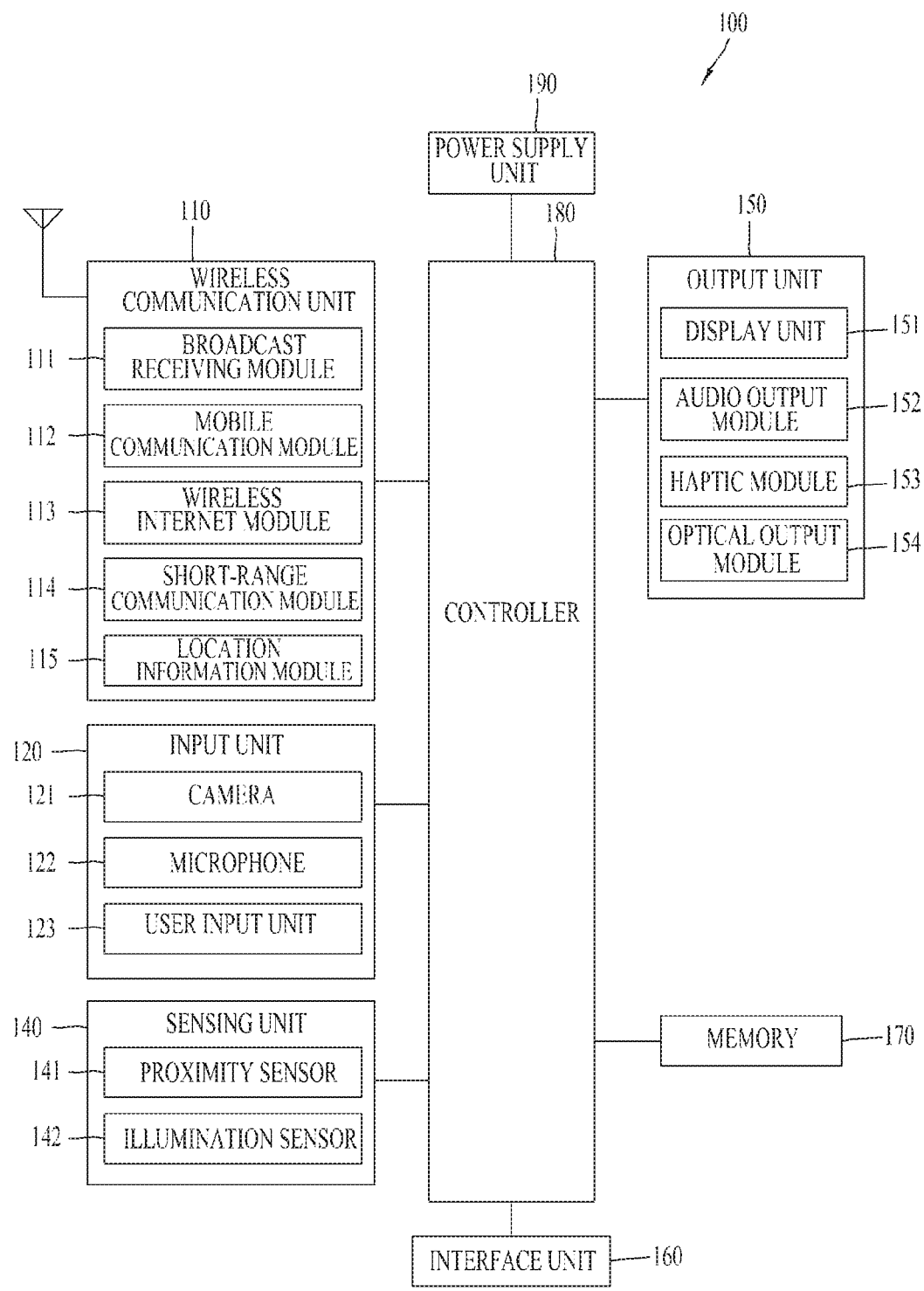
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
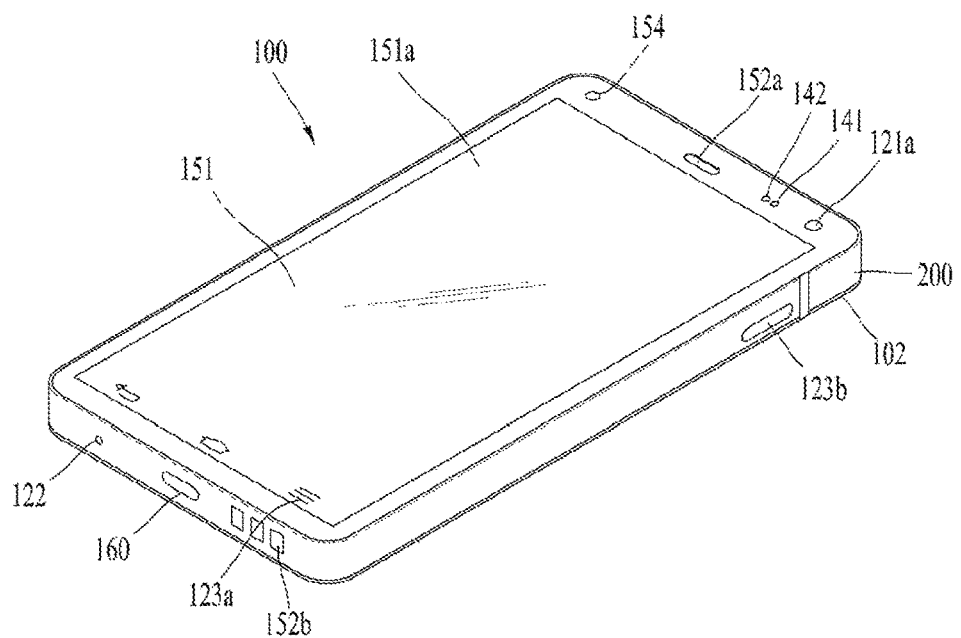
FIGS. 1B and 1C are conceptual views of one example of the mobile terminal, viewed from different directions.
Figure 1C:
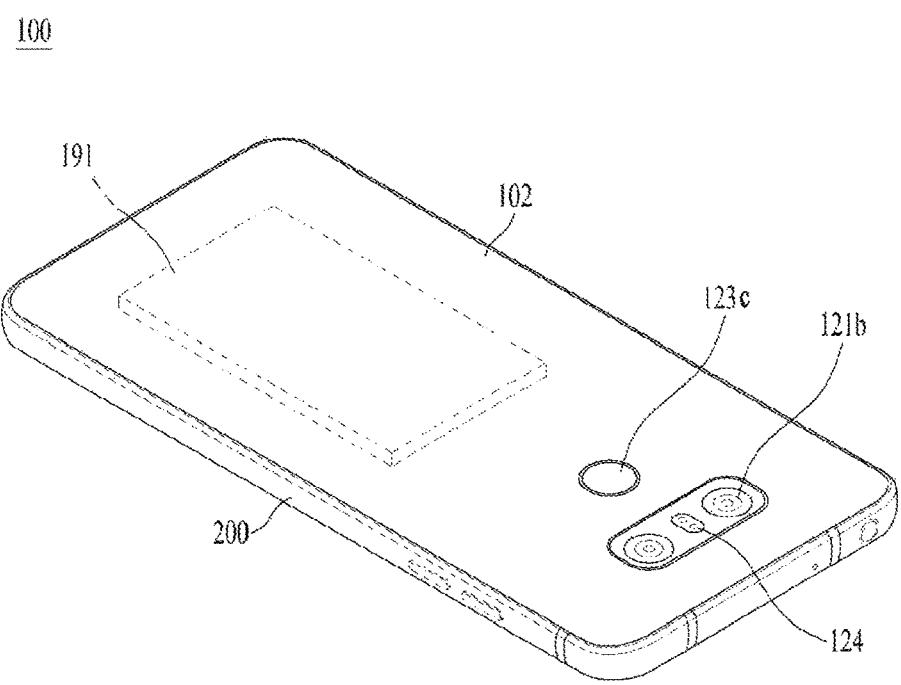

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in the FIG. 1A is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example—the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Hereinafter, referring to FIG. 1A, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal.

The display unit 151 is shown located on the front side of the terminal body to output information. As illustrated, a window 151a of the display unit 151 may form the front surface of the terminal body.

For the strength and rigidity, the mobile terminal 100 may include a middle frame (1051, see FIG. 2) configured to support a rear surface of the display unit 151. The middle frame 1051 may include metal for the strength and rigidity. Such the middle frame 1051 having metal may provide the mobile terminal with the strength and rigidity and be a large-area component having a conductive material to function as the ground. Accordingly, the middle frame may be connected with electronic components to ground the electronic components such as antennas.

The middle frame 1051 may be configured not to be exposed outside. Alternatively, the middle frame 1051 may be integrally formed with in a front case provided in the front surface of the terminal body or a side frame 1055 provided in a lateral surface of the terminal body.

As the multimedia function is expanded, the display unit 151 tends to become larger and the bezel arranged in an edge area of the display unit 151 tends to become smaller. Especially, an upper end area of the mobile terminal has to secure some space for loading the camera 121, the audio output unit 152, the proximity sensor 141 and the like. A lower end area of the mobile terminal has to secure some space for loading a physical button. Accordingly, it is limited to expand the display unit 151 in the mobile terminal.

However, the components may be miniaturized and a soft key is provided to realize the user input unit 123, instead of the physical button. The soft key is output on a screen if necessary and disappears unless necessary. Accordingly, the screen may be enlarged more.

In some embodiments, electronic components may also be mounted to the rear case 102. Examples of such electronic components include a detachable battery 191, an identification module, a memory card, and the like. Rear cover is shown covering the electronic components, and this cover may be detachably coupled to the rear case 102. Therefore, when the rear cover is detached from the rear case 102, the electronic components mounted to the rear case 102 are externally exposed.

In some embodiments, the rear case 102 may include an opening for externally exposing a camera 121*b* or an audio output module 152*b*.

The cases 102 may be formed by injection-molding synthetic resin or may be formed of a metal, for example, stainless steel (STS), aluminum (Al), titanium (Ti), or the like.

The mobile terminal 100 of the present embodiment includes a side case 200 that surrounds the side surface, and the side case 200 may include a metal material. However, for wireless communication performance, a part of the side case 200 may include a non-metallic material. As shown in FIGS. 1B and 1C, the side case 200 includes a plurality of antenna radiators 1055 made of a conductive material such as metal and slits 1056 of non-metallic material disposed between the antenna radiators 1055 (see FIG. 2).

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the rear case 102, to hermetically seal an inner space when those cases are coupled.

The mobile terminal 100 may include the display unit 151, the audio output module, the proximity sensor 141, the illuminance sensor 142, the optical output module 154, the camera 121, the user input unit 123, the microphone 122 and the interface unit 160. It will be described for the mobile terminal as shown in FIGS. 1B and 1C.

The display unit 151, the first audio output module 152*a*, the proximity sensor 141, an illumination sensor 142, the optical output module 154, the first camera 121*a* and the first manipulation unit 123*a* are arranged in front surface of the terminal body, the second manipulation unit 123*b*, the microphone 122, the second audio output modules 152*b* and interface unit 160 are arranged in side surface of the terminal body, and the second camera 121*b* are arranged in rear surface of the terminal body.

It is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies. In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (123c) may be located on the rear surface of the terminal body. The rear input unit (123c) can be manipulated by a user to provide input to the mobile terminal 100. The input may be used in a variety of different ways. For example, the rear input unit (123c) may be used by the user to provide an input for power on/off, start, end, scroll, control volume level being output from the first or second audio output modules 152a or 152b, switch to a touch recognition mode of the display unit 151, and the like. The rear input unit (123c) may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear case 102 that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

An accessory for protecting an appearance or assisting or extending the functions of the mobile terminal 100 can be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen Hereinafter, embodiments related with a control method which may be realized in the mobile terminal having the above-noted structure will be described, referring to the accompanying drawings.

As the multimedia function becomes more important, the wireless communication of the mobile terminal may be performed in diverse cases such as a short or long range or between devices. The frequency ranges used in that case are different from each other so that different antenna radiators may be used for the corresponding frequency ranges, respectively. In addition, diverse wireless communication techniques use diverse frequency ranges, respectively, only to increase the number of the antennas used for the diverse wireless communications.

With recent development of wireless communication techniques, massive data is transceived. To support that, MIMO (Multiple Input Output) configured to transceive signals in the same frequency range simultaneously or sequentially may be used. According to MIMO, two or more antennas are provided in a base station and the mobile terminal, respectively, to transmit data in several ways and interference between the signals received by the receiving ends may be reduced, while the transmission speeds of the signals are lowered. To apply such MIMO technique, the number of the antenna radiators provided in a limited size of the mobile terminal has to be increased.

In the conventional mobile terminal, MIMO technique is usually used in a mobile communication antenna for wireless communication with a base station. With recent increase of data communication traffic, a WIFI antenna includes a sub-antenna to apply MIMO thereto. WIFI uses not only signals at 2.4 GHz but also 5 GHz and then requires a plurality of antennas.

The antenna radiator forms an electromagnetic field and then exchanges interactions with a peripheral conductive material. Accordingly, interference might occur between the antenna radiators arranged nearby enough to cause performance deterioration of wireless signals. The antenna radiator may be attached to a case to be arranged in an outer area of the mobile terminal or the case may be used as the antenna radiator.

As the display unit tends to become larger, the size of the bezel arranged in right and left edges of the mobile terminal becomes almost zero so that a side case located next to the right and left edges of the display unit can have a difficulty in functioning as the antenna radiator. The antenna radiator may be dividedly realized in an upper area and a lower area of the mobile terminal. FIG. 2 is a diagram illustrating the rear case 102, the main board 181 and the bracket 105 which are provided in the mobile terminal 100 in accordance with one embodiment of the present disclosure. FIG. 2 (*a*) illustrates the rear case 102 and conductive patterns 201, 202, 203 and 204 which are formed in an inner surface of the rear case 102. The conductive patterns 201, 202, 203 and 204 formed in the inner surface of the rear case 102 are toward the inside of the terminal body, while being invisible from a back surface of the rear case 102. In the drawings, the patterns are illustrated as if being visible from the back surface of the rear case for easy understanding.

FIG. 2 (*b*) illustrates the main board 181. The main board 181 includes feeding portions (A and B) which are connected with the power supply unit and configured to feed an electric power; and ground portions (C and D) configured to ground the feeding portions (A and B) to electronic components. A different feeding portion is used according to each type of the antennas. Especially, diverse types of antennas are intensively arranged in an upper end area of the mobile terminal 100 and a plurality of feeding portions are provided in the upper end area.

FIG. 2 (*c*) illustrates a bracket 105 which is provided between the display unit 151 and the rear case 102. The bracket 105 may include a middle frame 1051 arranged in a rear surface of the display unit 151 to support the display unit 151; and a side frame 1055 provided to define a lateral surface of the mobile terminal 100.

The middle frame 1051 may include metal for strength and rigidity and function as a ground. The middle frame 1051 may be connected with a ground of the main board 181 and configured to increase a grounding area of the mobile terminal 100. A plurality of side frames 1055 may be arranged along the lateral surface of the mobile terminal 100. One side frame 1055 having one end connected with the middle frame 1051 and the other end which is open, spaced a preset distance apart from the neighboring side frame 1055, may be served as a radiator of a main antenna for a first signal.

The side frames 1055 may be provided as the conductive material arranged in the lateral surface of the mobile terminal 100 and partially connected with the middle frame 1051. The plurality of the side frames 1055 may be partitioned off by a slit 1056. In the mobile terminal in accordance with the present disclosure, the side frame 1055 having a first end connected with the middle frame 1051 and a second end having the slit 1056 therein not to be connected with the conductive material may be used as the main antenna.

The side frame 1055 having a first end connected with the middle frame 1051 provided as the ground and a second end which is open may be operated as a monopole antenna (PIFA antenna) once receiving the power from the first feeding portion (A) at a first point (a). The monopole antenna is able to transceive a signal having a wavelength which is four times as long as the antenna. The length of the side frame 1055 may be adjusted as ¼ of the wavelength of the first signal to be a resonance frequency and such micro-adjusting may adjust the resonance frequency by using a matching device.

In case of using MIMI, a sub-antenna 201 may be provided as the independent element from the main antenna 1055. The sub-antenna 201 may use a first conductive pattern 201 formed in the rear case as shown in FIG. 2 (*a*). The resonance frequency of the first conductive pattern 201 has to be corresponding to the frequency of the first signal to transceive the first signal. Accordingly, the first conductive pattern 201 may be as long as ¼ of the wavelength of the first signal.

The space limit of the mobile terminal 100 makes the first feeding portion (A) for the main radiator and the second feeding portion (B) for the sub-radiator arranged nearby as shown in FIG. 2 (*b*).

To reduce the interference between the main antenna 1055 and the sub-antenna 201, the first feeding portion (A) has to be arranged as far distant from the second feeding portion (B) as possible and the main radiator and the sub-radiator have to be extended in a different direction. The monopole antenna in accordance with this embodiment has current flow even at the ground and has the ground functioned as the radiator. Accordingly, when current flows are overlapped at the ground, mutual interference might occur disadvantageously.

FIG. 3 is a diagram to describe the current flow in the main-antenna 1055 and the sub-antenna 201 for a first signal of the mobile terminal. FIG. 3 (*a*) illustrates the current flow in the first conductive pattern 201 formed in the rear case 102 and FIG. 3 (*b*) illustrates the current flow in the bracket. The first feeding portion (A) is connected with a first point (a) of the side frame 1055 and the second feeding portion (B) is connected with (b) of the first conductive pattern 201 formed in the rear case 102 to apply currents.

The first feeding portion (A) is connected with the first point (a) of the side frame 1055. When the electric power is applied to the first point (a), electric currents flow along the side frame 1055 (see M1). The flow of the currents flowing along the main radiator (M1) induces the flow of the current even at the ground and current flow (M2) is shown along the middle frame 1051 (the ground) at the first point (a) connected with the first feeding portion (A).

The first conductive pattern 201 functioned as the sub-radiator is provided with the electric currents by the second feeding portion (B) and an electric current such as S1 flows to the first conductive pattern so that the first conductive pattern can transceive a signal. At this time, the currents (S1) flowing in the first conductive pattern (201) induces the flow (S2) of the currents to the ground. In the current flow to the ground, opposition between M2 and S2 might occur disadvantageously and interference occurs between the main radiator and the sub-radiator.

FIG. 4 is a diagram illustrating the ground current distribution at the ground of the main and sub antennas 1055 and 201 for the first signal provided in the mobile terminal 100. FIG. 4 (*a*) illustrates current distribution at the ground of the main antenna 1055 and FIG. 4 (*b*) illustrates current distribution at the ground of the sub-antenna 201. A dark area shows that the current density is high. When the high current density areas are located in the same direction, large interference occurs.

Figure 5:
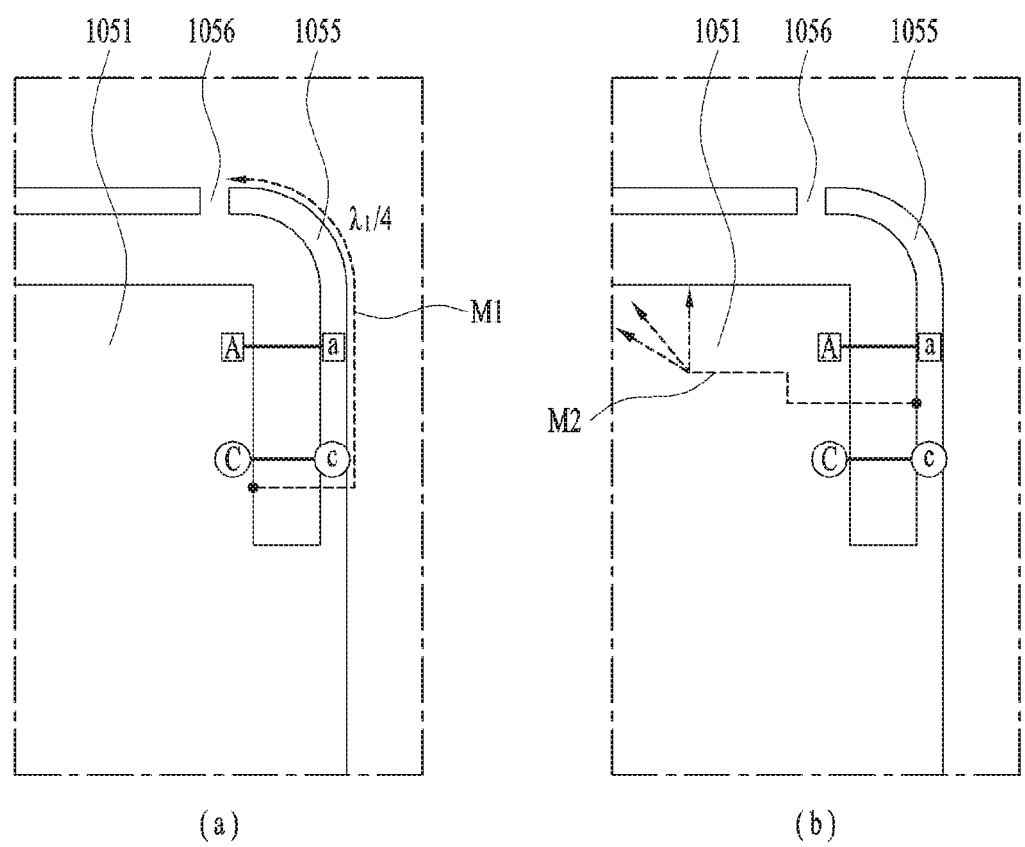
FIG. 5 is a diagram to describe an operation of a main-antenna for a first signal of the mobile terminal.

FIG. 5 is a diagram to describe the operation of the main-antenna 1055 for the first signal of the mobile terminal 100. To prevent the interference generated by the similar directions of the currents flowing at the ground, the mobile terminal in accordance with the present disclosure may further include a first grounding portion (C) arranged between the first feeding portion (A) and the second feeding portion (B). The first grounding portion (C) may be connected with a second point (c) of the side frame 1055. The second point (c) is located between the first point (a) and one end of the side frame 1055 connected with the middle frame 1051.

As the side frame 1055 is grounded t the second point (c), the flow of the current (M1) applied by the electric power supplied from the first feeding portion (A) is shut off at the second point (c) as shown in FIG. 5 (*a*) so that the electric currents may not flow toward one end of the side frame 1055. Accordingly, the length from the second point (c) to the first end is not used as the main antenna 1055 for the first signal substantially so that the length from the first grounding portion connected with the second point to the second end of the side frame 1055 may be ¼ of the first signal.

The flow of the currents in the main antenna 1055 is shown only in an upward direction (M1) which is toward the second end of the side frame at the second point (c) so that the flow of the electric currents at the ground by the main antenna 1055 may be in an upward direction (M2) shown in FIG. 5 (*b*).

Figure 6:
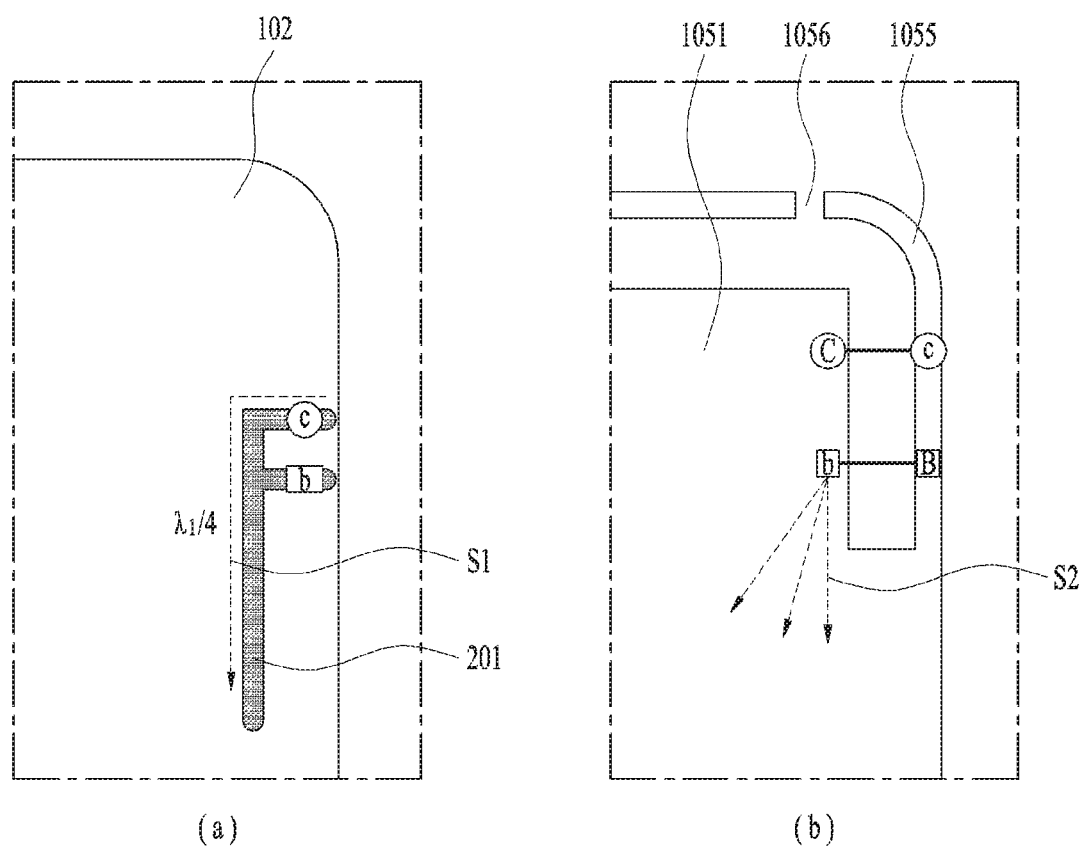
FIG. 6 is a diagram to describe an operation of a sub-antenna for a first signal of the mobile terminal.

FIG. 6 is a diagram to describe the operation of the sub-antenna 201 for the first signal of the mobile terminal 100. The flow of the currents in the first conductive pattern 201 provided with the electric power by the second feeding portion (B) is shown in FIG. 6(*a*). The flow of the electric currents (S2) in the ground may be along the flow of the currents (S1) in the sub-antenna 201 in the same direction.

FIG. 7 is a diagram illustrating the ground current distribution of the main and sub antennas 1055 and 201 for the first signal of the mobile terminal 100 in accordance with one embodiment. In the drawing, the directions in which the current density becomes higher are perpendicular to each other so that little interference may occur. The ground current flow (M2) shown in FIG. 5 (*b*) is not identical to the ground current flow (S2) shown in FIG. 6 (*b*) so that the current density may be differentiated.

The first grounding portion (C) is provided between the first feeding portion (A) and the second feeding portion (B) so as to sort the operation of the main antenna 1055 implemented by the electric power supplied by the first feeding portion (A) and the operation of the sub-antenna 201 implemented by the electric power supplied by the second feeding portion (B) from each other and reduce the interference between the main antenna 1055 and the sub-antenna 201 for transceiving the first signal.

In recent, a plurality of frequency bands may be used even in the same communication. For example, WIFI may use both the 2.4 GHz signal and the 5 GHz signal. Accordingly, the mobile terminal 100 has to include an antenna for transceiving the 2.4 GHz and further another antenna for transceiving the 5 GHz signal. The size of the frequency is in inverse proportion to the length of the wavelength so that the wavelength of the 2.4 GHz signal is longer than that of the 5 GHz signal. When the 2.4 GHz signal is referred to as the first signal, the 5 GHz signal is referred to as the second signal and the third conductive pattern 203 formed in the inner surface of the rear case 102 may be used as the antenna for the second signal.

Figure 8:
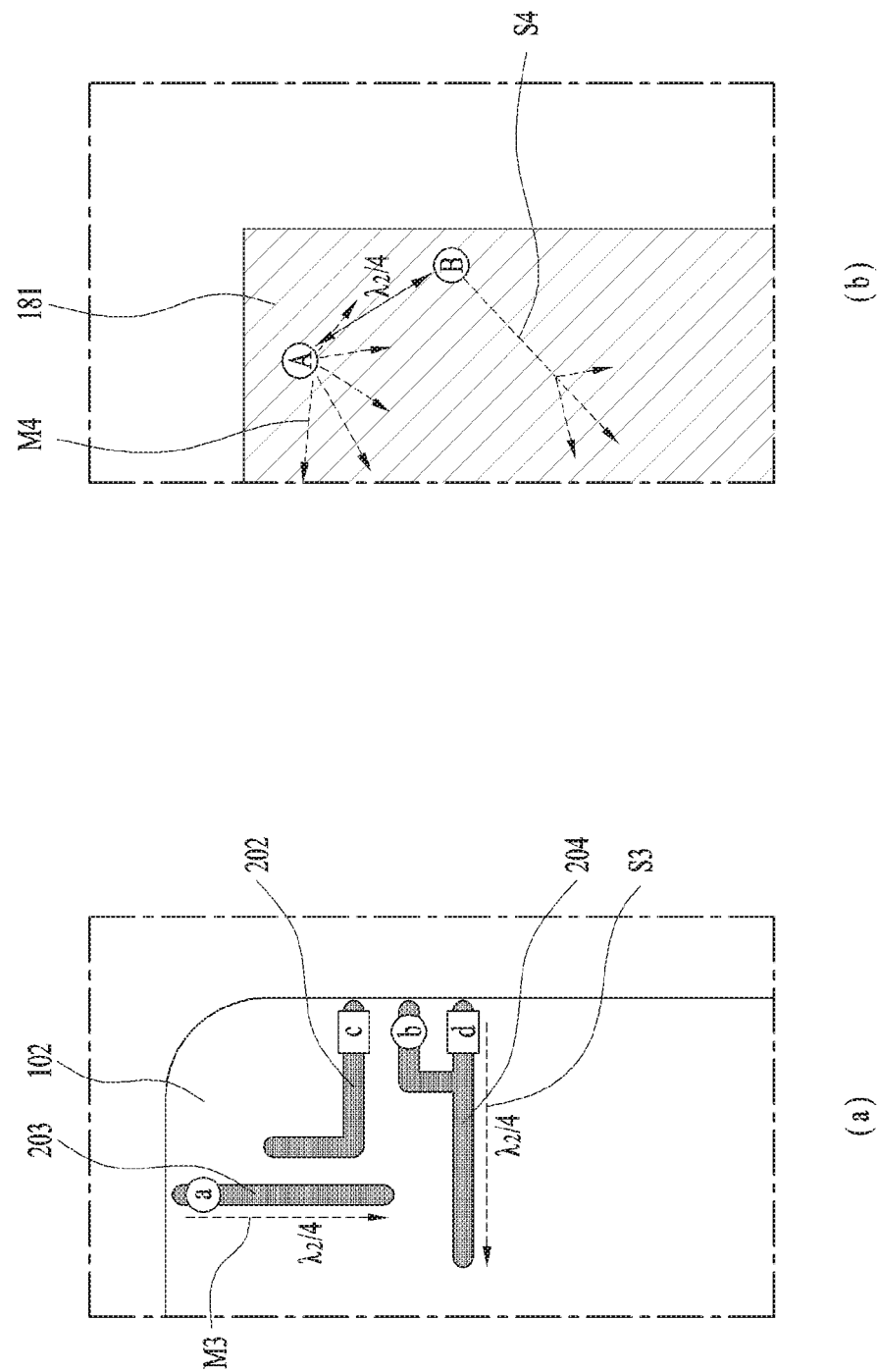
FIG. 8 is a diagram to describe operations of main and sub antennas for a second signal which are provided in the mobile terminal.

FIG. 8 is a diagram to describe the operations of the main and sub antennas 203 and 204 for the second signal which are provided in the mobile terminal 100. FIG. 9 is a diagram to describe the ground current distribution of the main and sub antennas 203 and 204 for the second signal which are provided in the mobile terminal 100. The antenna configured to transceive the second signal may also include the main antenna 203 and the sub-antenna 204. The electric power is applied to the sub-antenna 204 by the second feeding portion (B).

The main antenna 203 for the second signal also receives the electric power applied by the first feeding portion (A). The main antenna 203 is located near the second feeding portion (B) configured to supply the electric power to the sub-antenna 204 so that the interference between the main antenna 203 and the sub-antenna 204 might be an issue.

As shown in FIG. 8 (*a*), the power supply to the second conductive pattern 202 may use a coupling method. More specifically, a third conductive pattern 203 may be arranged near the second conductive pattern 202 connected with the first feeding portion (A), not directly connected with the first feeding portion (A), when the electric power is applied by the first feeding portion (A), the electric currents flowing to the second conductive pattern 202 may facilitate flow of electric currents to the third conductive pattern 203 and the third conductive pattern 203 is able to transceive a signal.

In this instance, the third conductive pattern 203 is connected with a second grounding portion (D) which is spaced a preset distance apart from the first grounding portion (C), when electric currents flow to the third conductive pattern 203, electric currents flow along the third conductive pattern 203 from the second grounding portion (D) and the third conductive pattern 203 then transceive the second signal. For matching the second signal, the third conductive pattern 203 may have a corresponding length to ¼ of the wavelength of the second signal.

As shown in FIG. 8 (b), the electric currents flowing (M3) in the third conductive pattern 203 allows electric currents (M4) to flow in the ground from the second grounding portion (D) connected with the third conductive pattern 203. The flow (M3) of the electric currents in the third conductive pattern 203 may allow electric currents to flow in the ground located in the main board 181.

A fourth conductive pattern formed in the rear case 102 may be used as the sub-antenna 204. The fourth conductive pattern 204 is connected with the second feeding portion (B) and the first grounding portion (C). The fourth conductive pattern 204 also has a corresponding length to ¼ of the wavelength of the second signal. When electric currents flow (S3) in the fourth conductive pattern 204, electric currents also flow (S4) in the ground from the first grounding portion (C).

As shown in FIG. 8 (a), the extension direction of the main antenna 203 and may be perpendicular to the extension direction of the sub-antenna 204 for the second signal so as to differentiate the ground electric current flow of the main antenna 203 from the ground electric current flow of the sub-antenna 204 as shown in FIG. 9. Especially, to prevent the interference between the ground electric current flow (M4) of the main antenna 203 and the ground electric current flow (S4) of the sub-antenna 204, the distance between the first grounding portion (C) at which the electric current flow starts and the second grounding portion (D) may be as far as ¼ or more of the second signal and the interaction there between may be minimized.

To avoid the interference between the ground electric current flow of the main antenna 203 and the ground electric current flow of the sub-antenna for the second signal, the second grounding portion (D) connected with the main antenna 203 is arranged distant from the first grounding portion (C) connected with the sub-antenna as far as 4/1 or more of the wavelength of the second signal. At this time, the feeding portion of the main antenna 203 is distant from the first feeding portion (A) so that the electric power may be supplied according to an indirect feeding method. In addition, the extension direction of the main antenna 203 is arranged perpendicular to that of the sub-antenna 204 so as to differentiate the directions of the electric current flow from each other. Accordingly, the electric current distribution shows three perpendicular directions as shown in FIG. 9.

As mentioned above, the mobile terminal in accordance with the present disclosure is capable of reducing interference between the ground electric current flow of the main antenna and the ground electric current flow of the sub-antenna and then realizing the MIMO antenna in the narrow area.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. A mobile terminal comprising:
    a case;
    a middle frame provided inside the case;
    a side frame having a first portion and a second portion spaced from the middle frame and configured to form a lateral surface of the mobile terminal, the first portion having a first point and a second point;
    a main board comprising a first feeding portion and a second feeding portion;
    a first conductive pattern provided inside the case and having a third point and a fourth point;
    a first line coupled with the first feeding portion and the first point of the first portion of the side frame;
    a second line coupled with the second feeding portion and the third point of the first conductive pattern; and
    a third line coupled with the second point of the first portion of the side frame and the fourth point of the first conductive pattern,
    wherein the first portion of the side frame comprises a first end coupled with the middle frame and a second open end spaced apart from the second portion,
    wherein the first portion of the side frame operates a first antenna of the mobile terminal,
    wherein the first conductive pattern operates a second antenna of the mobile terminal, and
    wherein the first antenna and the second antenna are configured to transceiver signals in a same frequency range simultaneously.

2. The mobile terminal of claim 1, wherein the case comprises a rear case covering a back side of the main board and form an external rear surface of the mobile terminal, and
    wherein the first conductive pattern is formed at an inner surface of the rear case.

3. The mobile terminal of claim 1, wherein a distance from the second point of the first portion of the side frame to the second open end of the first portion of the side frame corresponds to ¼ of a wavelength of a frequency of power source supplied by the first feeding portion.

4. The mobile terminal of claim 1, wherein the first conductive pattern is configured to transceive a first frequency signal having a wavelength that is four times a length of the first conductive pattern.

5. The mobile terminal of claim 1, wherein a first direction from the second point to the first point is different from a second direction from the fourth point to the third point.

6. The mobile terminal of claim 1, further comprising a second conductive pattern coupled with the first feeding portion.

7. The mobile terminal of claim 1, wherein:
    the first antenna functions as a main antenna; and
    the second antenna functions as a sub-antenna.

* * * * *